(No Model.)
C. H. SEITZ.
DEVICE FOR FORMING BUTTER BALLS.
No. 577,074.  Patented Feb. 16, 1897.
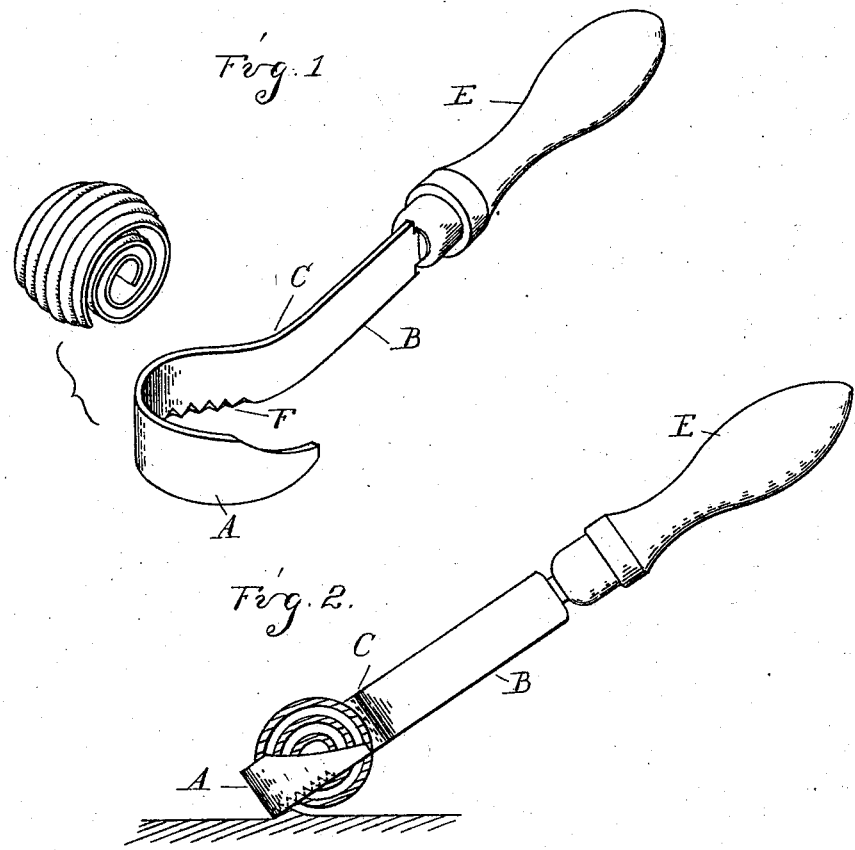
Witnesses
A. L. Habby
O. H. Barthel
Inventor
Charles H. Seitz
By Mss. S. Sprague & Son
Attys.

UNITED STATES PATENT OFFICE.

CHARLES H. SEITZ, OF DETROIT, MICHIGAN.

DEVICE FOR FORMING BUTTER-BALLS.

SPECIFICATION forming part of Letters Patent No. 577,074, dated February 16, 1897.

Application filed April 23, 1896. Serial No. 588,784. (No model.)

*To all whom it may concern:*

Be it known that I, CHARLES H. SEITZ, a citizen of the United States, residing at Detroit, in the county of Wayne and State of Michigan, have invented certain new and useful Improvements in Devices for Forming Butter-Balls, of which the following is a specification, reference being had therein to the accompanying drawings.

The invention consists in the construction of a device intended for use in forming butter balls or rolls for individual use; and it consists in a hooked blade which, being drawn over a piece of butter, will take off a thin narrow shaving and roll it into a ball or "pat."

The invention further consists in the construction, arrangement, and combination of the various parts, all as more fully hereinafter described.

In the drawings, Figure 1 is a perspective view of my improved device and one of the balls; and Fig. 2 is a side elevation thereof, showing it as in use.

The main feature of my invention is a hook A, formed in the shape of a blade, preferably of thin metal, having a suitable handle by which it can be drawn along over a piece of butter to cut off a shaving, as shown in Fig. 2, which will be rolled up into the form of a ball.

The preferred construction is as shown, in which this hook is formed at the end of a blade B, which is first bent to one side, as shown at C, and then in a graceful curve across the line of the straight portion B to form the hook, as shown. The straight portion B is provided with a suitable handle E.

Having the straight or pulling portion arranged with the hook extending on both sides gives a direct pull and prevents danger of turning and twisting in the hand, thus insuring a more perfectly formed roll. In order to give the shaving the proper rolling or turning effect to form a ball or roll, the cutting edge should be on the outer or convex side of the blade and the lower edge of the inner or concave face should preferably be provided with the notches or serrations F, which will give the desired rolling effect and will also form ridges on the shaving and thus add to its attractive appearance.

What I claim as my invention is—

1. A device for forming butter balls or "rolls" comprising a shank portion, a hook-shaped portion bent to extend on both sides of the shank portion, said hook-shaped portion having a cutting edge on its convex face and notches or grooves on its concave face, substantially as described.

2. A device for forming butter-balls comprising a handle, and a curved blade having an interrupted or notched edge on its inner face, and a continuous cutting edge on its outer face.

3. A device for forming butter-balls consisting of a curved flat blade having a series of grooves formed in its lower inner edge and a lower outer cutting edge, and a handle at the end of the blade.

In testimony whereof I affix my signature in presence of two witnesses.

CHARLES H. SEITZ.

Witnesses:
M. B. O'DOGHERTY,
OTTO F. BARTHEL.